United States Patent
Tsuiki et al.

(10) Patent No.: US 11,990,807 B2
(45) Date of Patent: May 21, 2024

(54) ELECTRIC ROTATING MACHINE

(71) Applicant: Mitsubishi Electric Corporation, Tokyo (JP)

(72) Inventors: Hironori Tsuiki, Tokyo (JP); Jumpei Yasutomi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 17/677,423

(22) Filed: Feb. 22, 2022

(65) Prior Publication Data

US 2023/0108657 A1 Apr. 6, 2023

(30) Foreign Application Priority Data

Oct. 4, 2021 (JP) .................................. 2021-163245

(51) Int. Cl.
*H02K 3/14* (2006.01)

(52) U.S. Cl.
CPC ..................................... *H02K 3/14* (2013.01)

(58) Field of Classification Search
CPC .. H02K 3/00; H02K 3/04; H02K 3/12; H02K 3/24; H02K 3/28; H02K 3/48; H02K 3/52
See application file for complete search history.

(56) References Cited

U.S. PATENT DOCUMENTS

2018/0048203 A1* 2/2018 Ohguchi ................ H02K 3/345

FOREIGN PATENT DOCUMENTS

| JP | 2016-39660 A | | 3/2016 | |
|----|----|----|----|----|
| JP | 2018074698 A | * | 5/2018 | ............... H02K 3/04 |
| JP | 2019146309 A | * | 8/2019 | ............... H02K 3/12 |
| WO | 2018/003461 A1 | | 1/2018 | |
| WO | 2020/240762 A1 | | 12/2020 | |

OTHER PUBLICATIONS

Office Action dated Oct. 18, 2022 in Japanese Application No. 2021-163245.

* cited by examiner

*Primary Examiner* — Tran N Nguyen
(74) *Attorney, Agent, or Firm* — Sughrue Mion, PLLC; Richard C. Turner

(57) ABSTRACT

In the electric rotating machine, a crank portion that is displaced in a radial direction of an armature iron core is provided in an apex portion of a coil end portion; a first oblique side that slants with respect to an axis-direction endface of the armature iron core connects a first coil conductor portion with the crank portion; a second oblique side that slants with respect to the axis-direction endface of the armature iron core connects a second coil conductor portion with the crank portion; at least one of the first oblique side and the second oblique side has an inflection point, before being connected with the crank portion, that functions as a base point of a bending portion that is bent toward a radially outside of the armature iron core.

4 Claims, 10 Drawing Sheets

ELECTRIC ROTATING MACHINE

BACKGROUND OF THE INVENTION

Field of the Invention

The present disclosure relates to an electric rotating machine.

Description of the Related Art

In many cases, it is required that an electric rotating machine such as a motor or an electric power generator is small-size and high-output. Because in an electric rotating machine, no coil end for connecting coils inserted into respective slots of a stator iron core relates to operation of the electric rotating machine in terms of electromagnetism, it is important that in order to downsize the electric rotating machine, the coil end is downsized as much as possible. As far as downsizing of the coil end is concerned, to date, as disclosed, for example, in Patent Documents 1 and 2, there has been realized the downsizing of the coil end in such a way that cranks for displacing respective coils to be inserted into the slots in the radial direction of the electric rotating machine are provided on the apex portions of the coil ends so as to raise the density of the coil end.

PRIOR ART REFERENCE

Patent Document

[Patent Document 1] International Publication No. WO2020/240762
[Patent Document 2] International Publication No. WO2018/003461

SUMMARY OF THE INVENTION

The coil end of the conventional electric rotating machine disclosed in Patent Document 1 needs to be manufactured by use of 3-dimensional molding; because the configuration of the die and the manufacturing method therefor become complex, the control of the products and securing the quality become difficult. In addition, the coil end of the armature in the conventional electric rotating machine disclosed in Patent Document 2 is provided with a crank (bending portion) in the oblique side thereof; however, because the molding of the crank is complex and the bending portions crowd, damage to the film applied to the lead wire is large and hence there has been anxiety that an insulation failure is caused in the coil end.

The present disclosure is to disclose a technology for solving the foregoing problems; the objective of the present disclosure is to provide an electric rotating machine that is readily manufactured and realizes downsizing.

An electric rotating machine disclosed in the present disclosure includes an armature iron core provided with two or more teeth arranged in a ring-shaped manner and with a ring-shaped yoke for connecting the two or more teeth, an armature coil mounted on the armature iron core, and a rotor that has a magnetic-field pole and whose outer circumferential portion faces an inner circumference portion of the armature iron core through an air gap. In the electric rotating machine, the armature coil includes two or more armature-coil elements whose cross sections are each formed in a rectangular shape; the armature-coil element has a first coil conductor portion and a second coil conductor portion that are contained, at a predetermined pitch, in respective slots formed between the teeth that are adjacent to each other, and a coil end portion that connects the first coil conductor portion with the second coil conductor portion and that is disposed at an axis-direction end portion of the armature iron core; the coil end portion has a crank portion that is provided in an apex portion of the coil end portion and is displaced in a radial direction of the armature iron core, a first oblique side that connects the first coil conductor portion with the crank portion and slants with respect to an axis-direction endface of the armature iron core, and a second oblique side that connects the second coil conductor portion with the crank portion and slants with respect to the axis-direction endface of the armature iron core; at least one of the first oblique side and the second oblique side has an inflection point, before being connected with the crank portion, that functions as a base point of a bending portion that is bent toward a radially outside of the armature iron core.

The present disclosure makes it possible to obtain an electric rotating machine that is readily manufactured and realizes downsizing.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
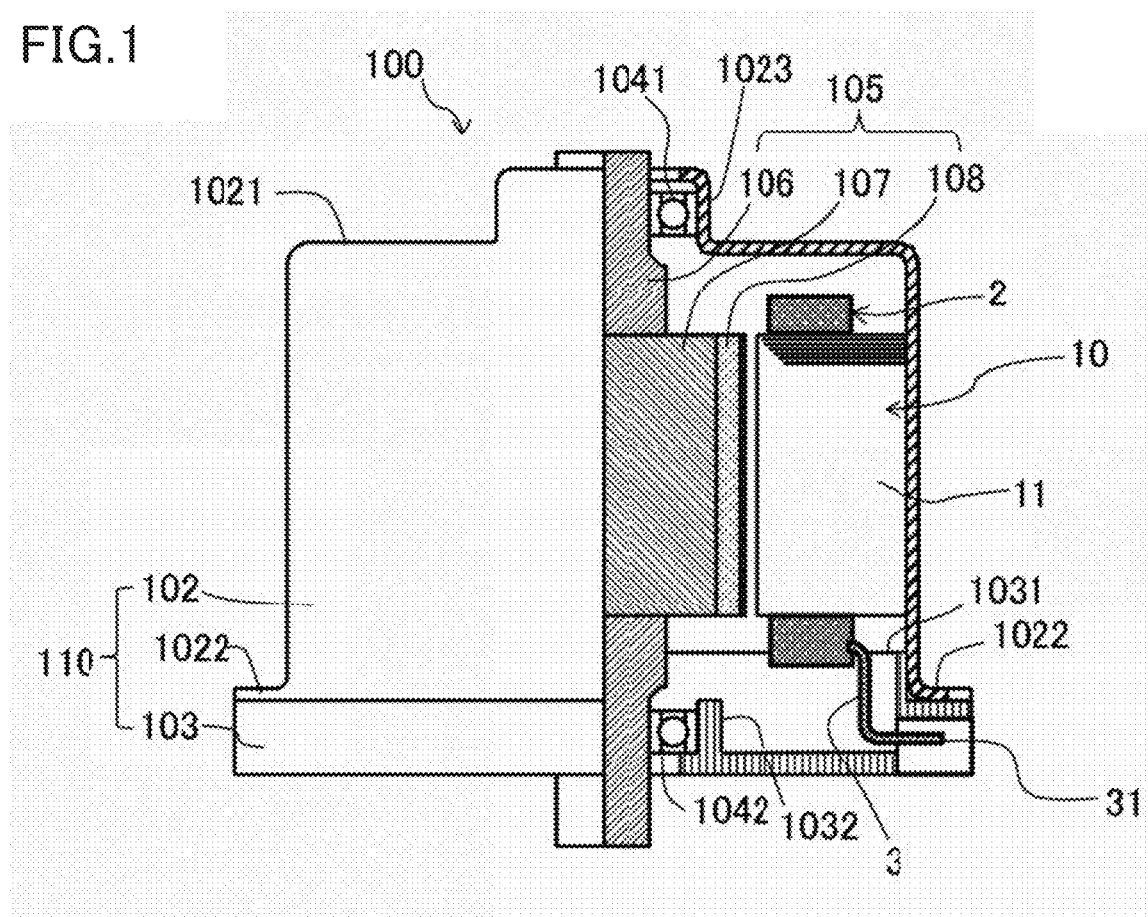
FIG. 1 is a schematic view of an electric rotating machine according to Embodiment 1.

Hereinafter, an electric rotating machine and a manufacturing method therefor according to Embodiment 1 of the present disclosure will be explained by use of the drawings. FIG. 1 is a schematic view of an electric rotating machine according to Embodiment 1. In FIG. 1, an electric rotating machine 100 has a housing 110 including a metal frame 102 and a metal end plate 103. The frame 102 is formed in the shape of a bottomed cylindrical tube whose one axis-direction end portion is closed with a bottom portion 1021 and whose the other axis-direction end portion is opened. A ring-shaped flange 1022 protruding toward the radially outside of the frame 102 is formed in said the other axis-direction end portion of the frame 102. A first bearing holding portion 1023 is provided in the radial-direction central portion of the bottom portion 1021 of the frame 102.

The end plate 103 is provided with a ring-shaped protruding portion 1031 protruding in the axial direction from one axis-direction endface and a second bearing holding portion 1032 formed in the radial-direction central portion. The ring-shaped protruding portion 1031 is inserted into the inside of the frame 102 through the opening portion thereof and the peripheral portion of the end plate 103 abuts on the axis-direction endface of the flange 1022, so that the end plate 103 is fixed to the frame 102. Said the other axis-direction end portion, of the frame 102, that is opened is closed by the end plate 103 fixed to the frame 102. The outer circumferential surface of the ring-shaped protruding portion 1031 abuts on the inner circumferential surface of the frame 102.

An armature 10 as the stator has an armature iron core 11, configured in such a way that two or more electromagnetic steel plates are stacked in the axial direction and in the shape of a hollow cylindrical tube, and armature coils 2 inserted into respective two or more slots that each open toward the inner circumferential surface of the armature iron core 11. The armature iron core 11 is fitted with the inner circumferential surface of the frame 102 and is fixed to the frame 102.

A rotor 105 has a rotor shaft 106, a rotor iron core 107 fixed to the rotor shaft 106, and two or more permanent magnets 108 fixed to the rotor iron core 107. The two or more permanent magnets 108 are embedded in the outer circumferential surface of the rotor iron core 107 at a predetermined pitch in the circumferential direction of the rotor iron core 107, so that magnetic-field poles are configured.

One axis-direction end portion of the rotor shaft 106 is pivotably supported by a first bearing 1041 held by the first bearing holding portion 1023. The other axis-direction end portion of the rotor shaft 106 is pivotably supported by a second bearing 1042 held by the second bearing holding portion 1032. The outer circumferential surface of the rotor iron core 107 faces the inner circumferential surface of the armature iron core 11 through a predetermined-dimension air gap.

A power-supply wire 3 for supplying electric power to the armature coil 2 has a power-supply terminal 31 that extends in the axial direction from the armature coil 2 at the radially inside of the protruding portion 1031 and then faces the outside of the electric rotating machine 100 through a penetration hole 1033 provided in the end plate 103. The power-supply terminal 31 is mechanically and electrically connected with a power source through screwing or the like.

In addition, the rotor 105 is not limited to a permanent-magnet rotor; it maybe allowed that there is utilized a squirrel-cage rotor in which an uninsulated rotor conductor is contained in a rotor-iron-core slot and the both ends of the rotor conductor are short-circuited by a short-circuit ring or a coil-type rotor in which an insulated rotor coil is mounted in a rotor-iron-core slot.

Figure 2:
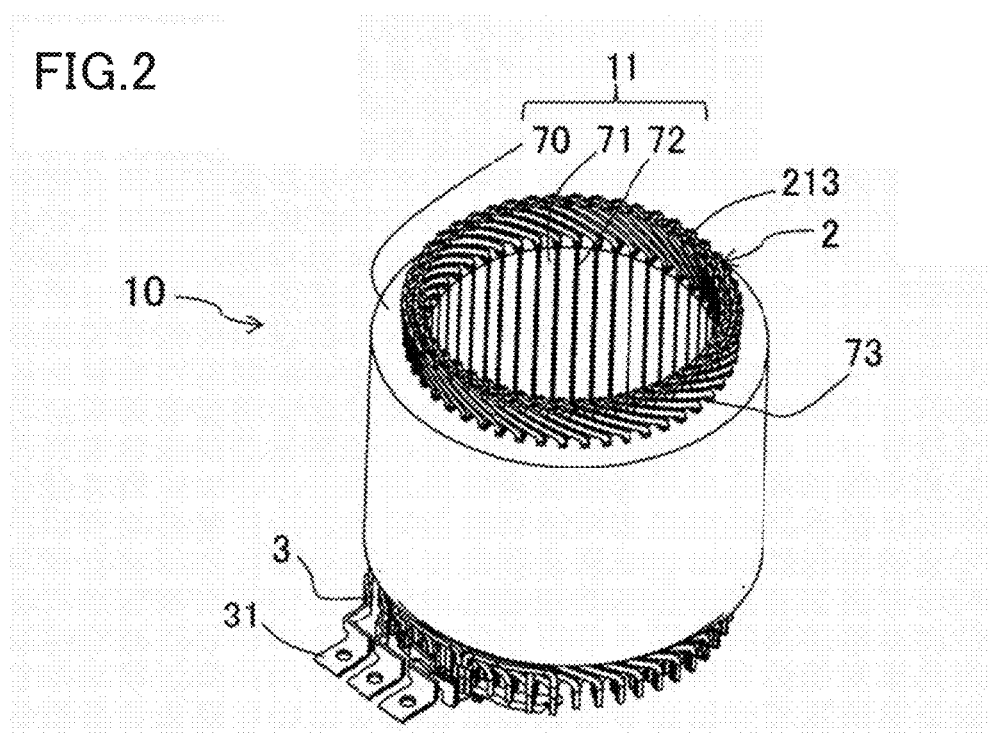
FIG. 2 is a perspective view of an armature in the electric rotating machine according to Embodiment 1.

FIG. 2 is a perspective view of the armature in the electric rotating machine according to Embodiment 1. In FIG. 2, the armature 10 has the armature iron core 11 and the armature coils 2. The armature iron core 11 has two or more teeth 71 formed in such a way as to be radially aligned in the inner circumference portion thereof, two or more slots 72 each of which is formed between adjacent teeth 71, a yoke 70 for coupling respective teeth 71, and the armature coils 2 each of which is mounted in the slot 72. The armature coils 2 are connected with one another in three-phase delta connection or in three-phase star connection.

An insulation sheet 73 formed of, for example, an insulating material such as a PET (Polyethyleneterephthalate), a PPS (Poly Phenylene Sulfide Resin), or aramid fiber is sandwiched between the armature coils 2 and the armature iron core 11, so that the armature coil 2 and the armature iron core 11 are electrically isolated from each other.

A coil end portion 213 of the armature coil 2 is disposed at one axis-direction end portion of the armature iron core 11; a connecting conductor for connecting the respective armature-coil elements, the power-supply wire 3 for supplying electric power to the armature coil 2, and the power-supply terminal 31 connected with the power-supply wire 3 is arranged at the other axis-direction end portion of the armature iron core 11. The electric rotating machine 100 according to Embodiment 1 is a three-phase AC rotating machine; the power-supply wire 3 and the power-supply terminal 31 are provided for each of the three phases.

Figure 3:
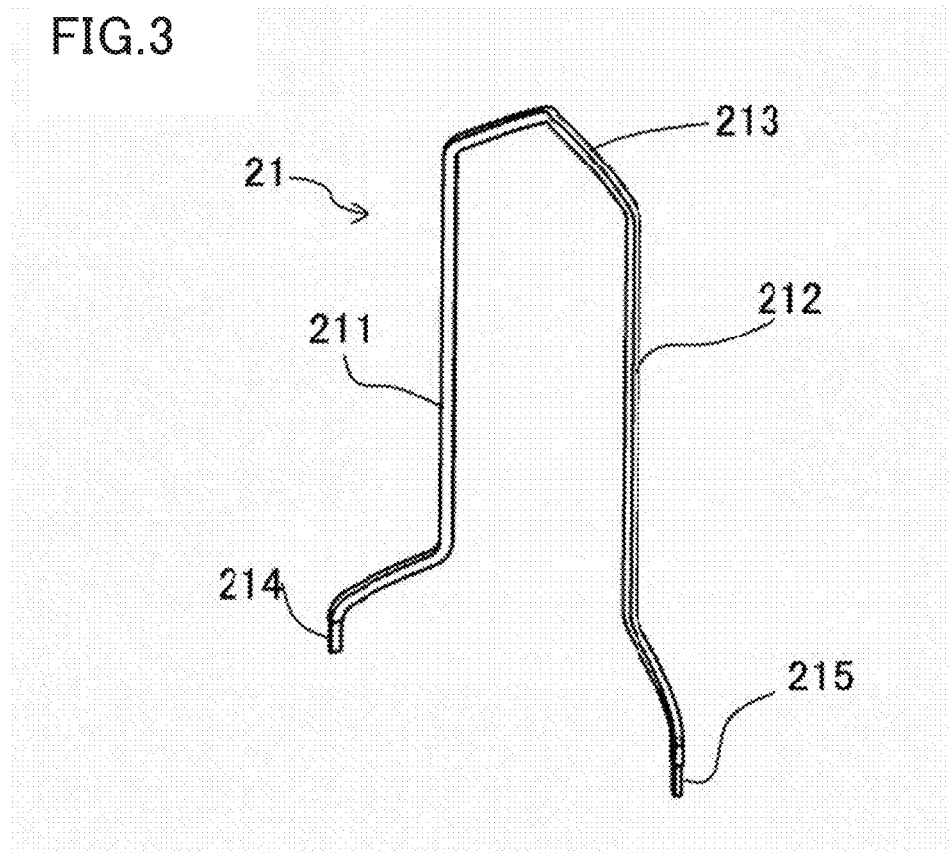
FIG. 3 is a perspective view of an armature-coil element of the electric rotating machine according to Embodiment 1.

Next, an armature-coil element included in the armature coil 2 will be explained. FIG. 3 is a perspective view of an armature-coil element in the electric rotating machine according to Embodiment 1.

In FIG. 3, an armature-coil element 21 is formed of a segment coil that is produced by bending a rectangular-cross-section lead wire into a U-shaped one; the armature-coil element 21 is provided with a first coil conductor portion 211 and a second coil conductor portion 212 that are each inserted into the slots 72 of the armature iron core 11, the coil end portion 213 for electrically and mechanically connecting respective one end portions of the first coil conductor portion 211 and the second coil conductor portion 212, a first coil terminal 214 formed at the other end portion of the first coil conductor portion 211, and a second coil terminal 215 formed at the other end portion of the second coil conductor portion 212. The material of a coil conductor 210 is, for example, cupper or aluminum.

The two or more armature-coil elements 21 configured in such a manner as described above are inserted into the respective slots 72 of the armature iron core 11 and are mutually connected by connecting conductors at the other axial-direction end portion of the armature iron core 11, so that the armature coil 2 is configured. In some cases, the first coil terminal 214, the second coil terminal 215, and the connecting conductor for connecting the first coil terminal 214 with the second coil terminal 215 may collectively be referred to as a coil end portion.

Figure 4:
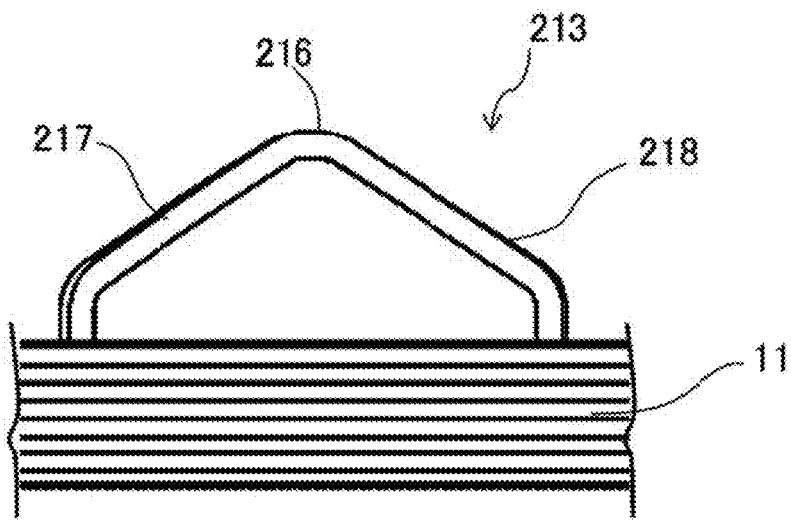
FIG. 4 is a schematic view of the coil end portion of an armature-coil element in the electric rotating machine according to Embodiment 1, when viewed from a direction perpendicular to the axial direction of the electric rotating machine.
Figure 5:
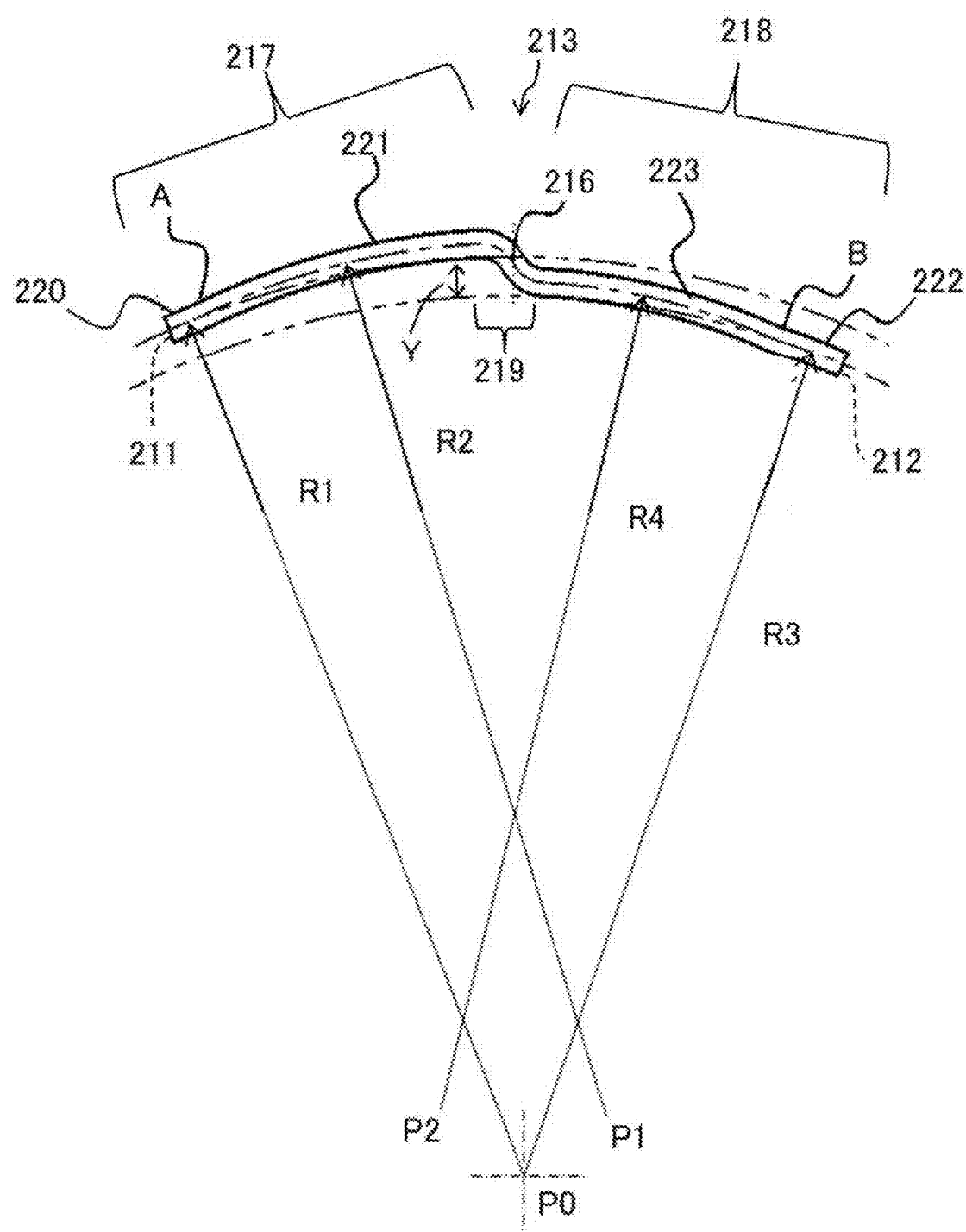
FIG. 5 is an explanatory view of the coil end portion of an armature-coil element in the electric rotating machine according to Embodiment 1, when viewed from the axial direction of the electric rotating machine.

FIG. 4 is a schematic view of the coil end portion of an armature-coil element in the electric rotating machine according to Embodiment 1, when viewed from a direction perpendicular to the axial direction of the electric rotating machine; FIG. 5 is an explanatory view of the coil end portion of an armature-coil element in the electric rotating machine according to Embodiment 1, when viewed from the axial direction of the electric rotating machine. In FIG. 4, the coil end portion 213 is formed in such a way that the shape thereof is mountain-shaped when viewed from a direction perpendicular to the axial direction of the electric rotating machine 100; the coil end portion 213 has an apex portion 216, a first oblique side 217 connecting one end portion of the apex portion 216 with the first coil conductor portion 211, and a second oblique side 218 connecting the other end portion of the apex portion 216 with the second coil conductor portion 212.

FIG. 5 is an explanatory view of the coil end portion of an armature-coil element in the electric rotating machine according to Embodiment 1, when viewed from the axial direction of the electric rotating machine. In FIG. 5, the coil end portion 213 has a crank portion 219 between the first oblique side 217 and the second oblique side 218; the crank portion 219 is displaced in the radial direction of the electric rotating machine 100. The crank portion 219 includes the apex portion 216 of the coil end portion 213.

The first oblique side 217 of the coil end portion 213 has a first bending portion 220 ranging from the first coil conductor portion 211 (extending backward in a direction perpendicular to the paper plane of FIG. 5) to a first inflection point A and a second bending portion 221 ranging from the first inflection point A to the crank portion 219. The base point PO of the curvature radius R1 of the first bending portion 220 is situated on the center axis of the electric rotating machine 100; the base point P1 of the curvature radius R2 of the second bending portion 221 is situated at a point displaced toward the radially outside of electric rotating machine 100 from the center axis of the electric rotating machine 100. In this situation, R1 is larger than R2, i.e., the curvature of the second bending portion 221 is set to be larger than that of the first bending portion 220. Changing the curvatures in such a manner as described above makes it possible to displace the first oblique side 217 more toward the outer diameter side.

The second oblique side 218 of the coil end portion 213 has a third bending portion 222 ranging from the second coil conductor portion 212 (extending backward in a direction perpendicular to the paper plane of FIG. 5) to a second inflection point B and a fourth bending portion 223 ranging from the second inflection point B to the crank portion 219. The base point PO of the curvature radius R3 of the third bending portion 222 is situated on the center axis of the electric rotating machine 100; the base point P2 of the curvature radius R4 of the fourth bending portion 223 is situated at a position displaced toward the radially outside of electric rotating machine 100 from the center axis of the electric rotating machine 100. In this situation, R3 is larger than R4, i.e., the curvature of the fourth bending portion 223 is set to be larger than that of the third bending portion 222. Changing the curvatures in such a manner as described above makes it possible to displace the second oblique side 218 more toward the outer diameter side.

The crank portion 219 connects the first oblique side 217 including the first bending portion 220 and the second bending portion 221 with the second oblique side 218 including the third bending portion 222 and the fourth bending portion 223. By being connected with the second oblique side 218 through the crank portion 219, the first oblique side 217 is displaced by a dimension Y toward the radially outside of the electric rotating machine 100. In this situation, as the relationship between the dimension Y and a width dimension Z of the conductor forming the coil end portion 213, the equation [Y Z] is established. Each of the first bending portion 220, the second bending portion 221, the third bending portion 222, and the fourth bending portion 223 has no oblique side in its axial direction.

The first coil conductor portion 211 and the second coil conductor portion 212 of each of the two or more armature-coil elements 21 are inserted into the respective slots 72 of the armature iron core 11 at a predetermined pitch, so that the armature coil 2 is configured. The first oblique side 217, at the coil end portion 213, of the armature-coil element 21 is disposed in such a way as to be superimposed on the radially outside of the second oblique side 218, at the coil end portion 213, of the adjacent armature-coil element 21.

As described above, the respective bending portions having different curvatures are formed in the first oblique side 217 and the second oblique side 218 and the crank portion 219 connects the first oblique side 217 with the second oblique side 218, so that there can be suppressed an interference, at the coil end portion 213, of the adjacent armature-coil elements 21; concurrently, because the coil end portion can further be downsized, the electric rotating machine 100 can further be downsized.

Moreover, having an inflection point makes it possible to displace the oblique side toward the outer diameter side and hence the interference between the adjacent coil ends at the crank portion can be suppressed. Furthermore, when the coil end portion is viewed from the axial direction, a two-dimensional shape without any twist and any bending is obtained; therefore, not only the manufacturing but also the control of the product shape is facilitated.

It may be allowed that connection between the first coil terminal 214 and the connecting conductor for connecting the armature-coil elements and connection between the second coil terminal 215 and the connecting conductor are performed through any one of crimping, brazing, or the like while welding and heating are made.

Figure 6:
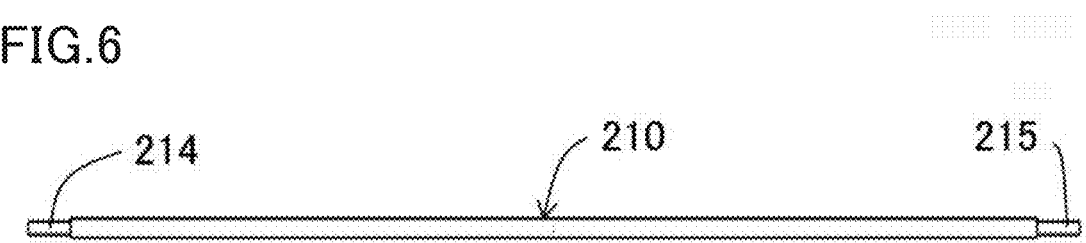
FIG. 6 is a schematic view for explaining a manufacturing method for an armature-coil element of the electric rotating machine according to Embodiment 1.

Next, the manufacturing method for the armature coil in the electric rotating machine according to Embodiment 1 will be explained. Each of FIGS. 6 through 10 is a schematic view for explaining a manufacturing method for an armature-coil element in the electric rotating machine according to Embodiment 1; FIG. 11 is a perspective view for explaining a manufacturing method for the armature coil in the electric rotating machine according to Embodiment 1. At first, as illustrated in FIG. 6, the coil conductor 210 whose outer layer is coated with an insulating material and that has a rectangular cross section is linearly cut out and the coated insulating layers at the both ends are peeled off, so that the first coil terminal 214 and the second coil terminal 215 are produced.

Figure 7:
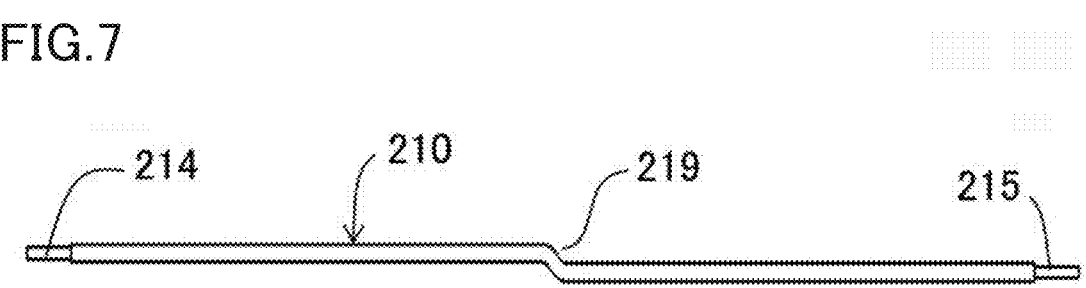
FIG. 7 is a schematic view for explaining a manufacturing method for an armature-coil element of the electric rotating machine according to Embodiment 1.
Figure 8:
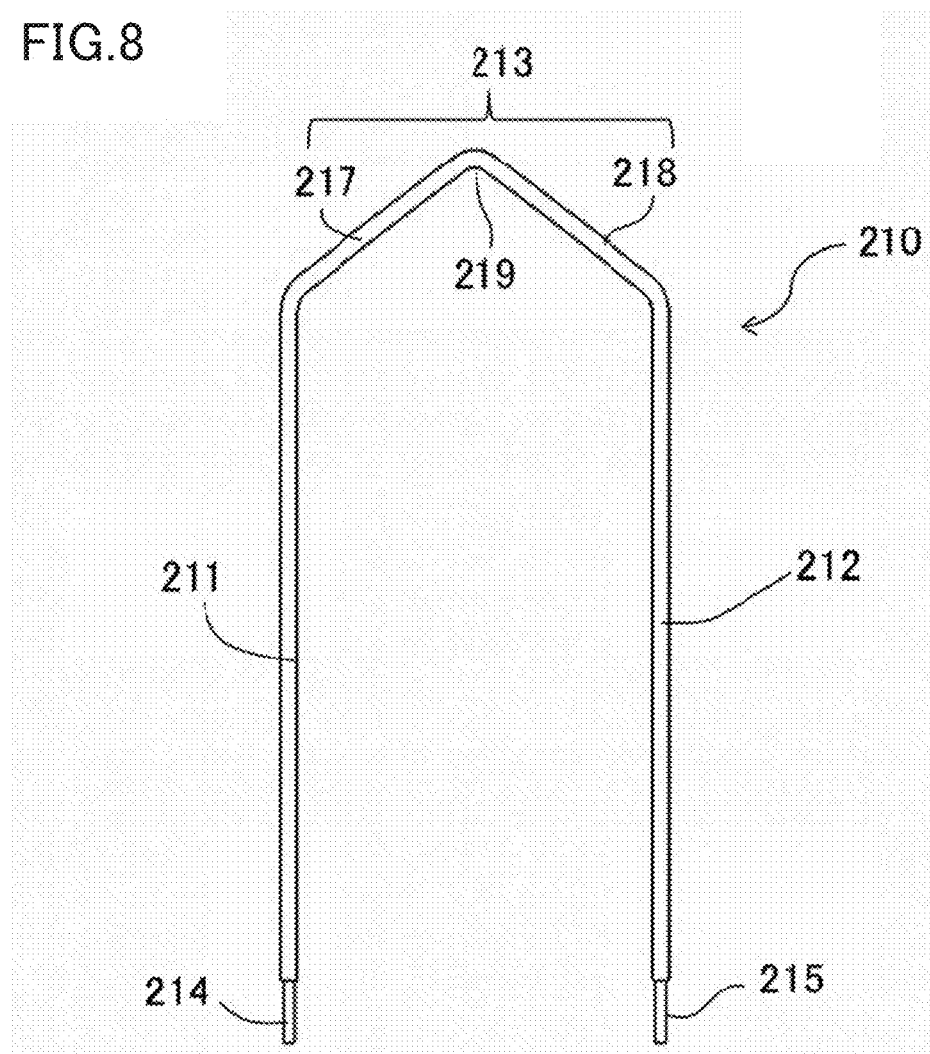
FIG. 8 is a schematic view for explaining a manufacturing method for an armature-coil element of the electric rotating machine according to Embodiment 1.

Next, as illustrated in FIG. 7, the crank portion 219 is formed at the longitudinal-direction central portion of the coil conductor 210; then, as illustrated in FIG. 8, the coil conductor 210 is bent in a direction perpendicular to the bending direction of the crank portion 219, so that the first oblique side 217, the second oblique side 218, the first coil conductor portion 211, and the second coil conductor portion 212 are formed.

Figure 9:
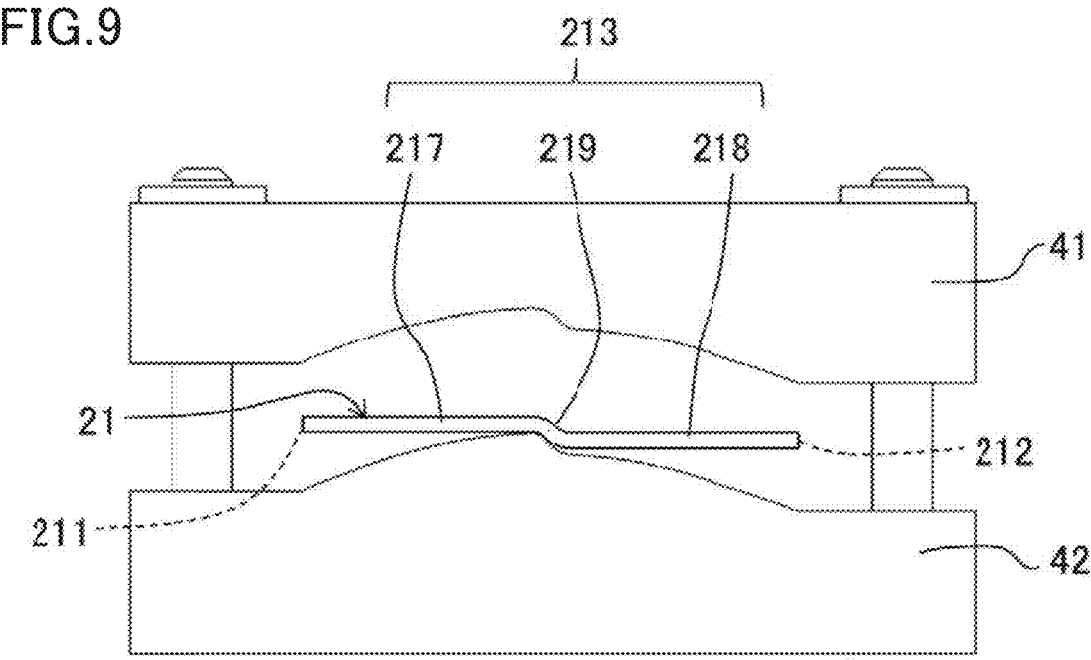
FIG. 9 is a schematic view for explaining a manufacturing method for an armature-coil element of the electric rotating machine according to Embodiment 1.
Figure 10:
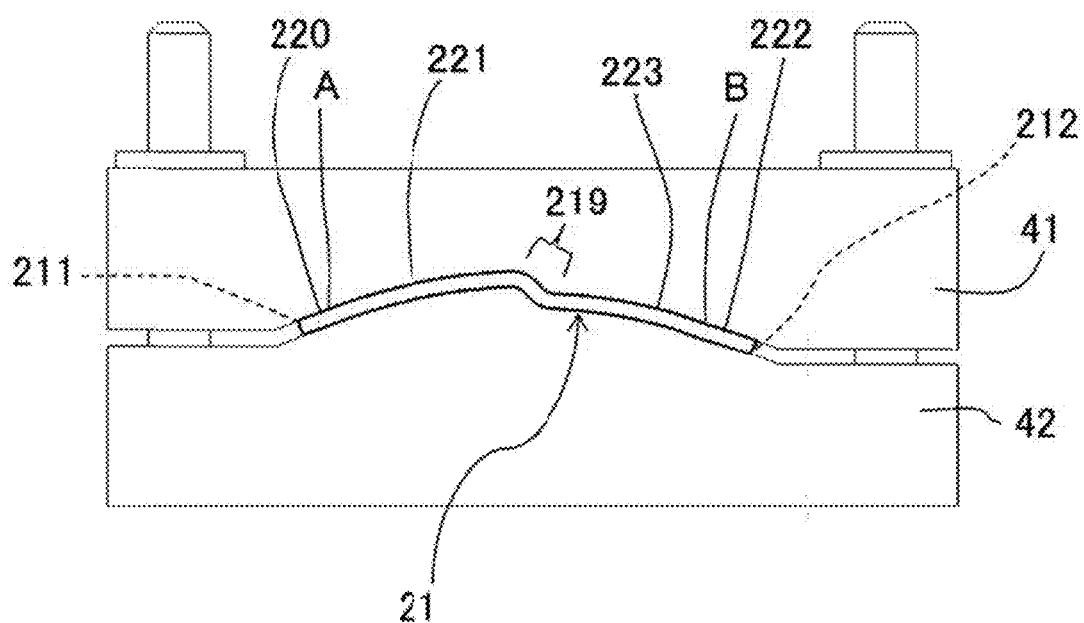
FIG. 10 is a schematic view for explaining a manufacturing method for an armature-coil element of the electric rotating machine according to Embodiment 1.
Figure 11:
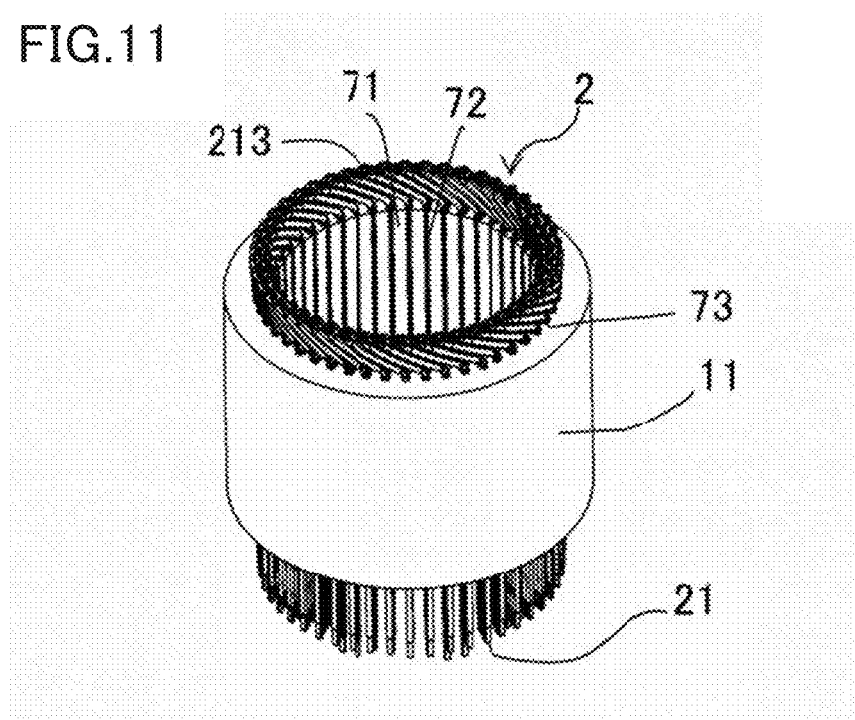
FIG. 11 is a perspective view for explaining a manufacturing method for the armature coil in the electric rotating machine according to Embodiment 1.

Next, as illustrated in FIG. 9, the coil end portion 213 of the armature-coil element 21 is inserted between a first die 41 and a second die 42 and then, as illustrated in FIG. 10, the first die 41 is pressed toward the second die 42, so that the first bending portion 220 and the second bending portion 221 are formed in the first oblique side 217 and the third bending portion 222 and the fourth bending portion 223 are formed in the second oblique side 218.

In this situation, each of the first bending portion 220, the second bending portion 221, the third bending portion 222, and the fourth bending portion 223 has no oblique side in its axial direction. Accordingly, each of the first die 41 and the second die 42 needs only to have curved surfaces corresponding to the curvature radiuses R1, R2, R3, and R4 of the first bending portion 220, the second bending portion 221, the third bending portion 222, and the fourth bending portion 223, respectively, of the coil end portion 213; each of the first die 41 and the second die 42 needs to have no oblique side in its curved-surface direction. Therefore, the production of the first die 41 and the second die 42 is facilitated, and ascertainment of the dimensional accuracy of the molded coil conductor is facilitated; thus, the quality control is facilitated.

As illustrated in FIG. 11, the first coil conductor portion 211 and the second coil conductor portion 212 of the armature-coil element 21 produced in such a manner as described above are inserted into the respective slots 72 at a predetermined pitch. The respective coil conductor portions of two pieces of the armature-coil elements 21 are inserted into a single slot 72.

After the respective coil end portions 213 of the armature-coil elements 21 exposed from the one axis-direction end portion of the armature iron core 11 are superimposed on the coil end portions 213 of the adjacent two or more armature-coil elements 21, the insulation sheet 73 is inserted into the slot 72 in the axial direction of the armature iron core 11. After that, the end portion of each of the armature-coil elements 21 exposed from the other axis-direction end portion of the armature iron core 11 is molded into the one having a predetermined shape in the circumferential direction of the armature iron core 11 and is connected with another armature-coil element 21.

Figure 12A:
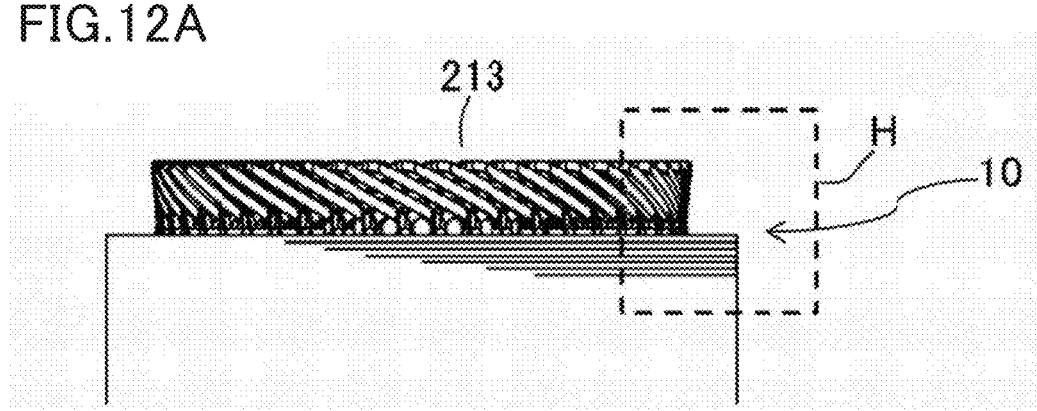
FIG. 12A is a schematic view illustrating the coil end portion of the armature coil of the electric rotating machine according to Embodiment 1.
Figure 12B:
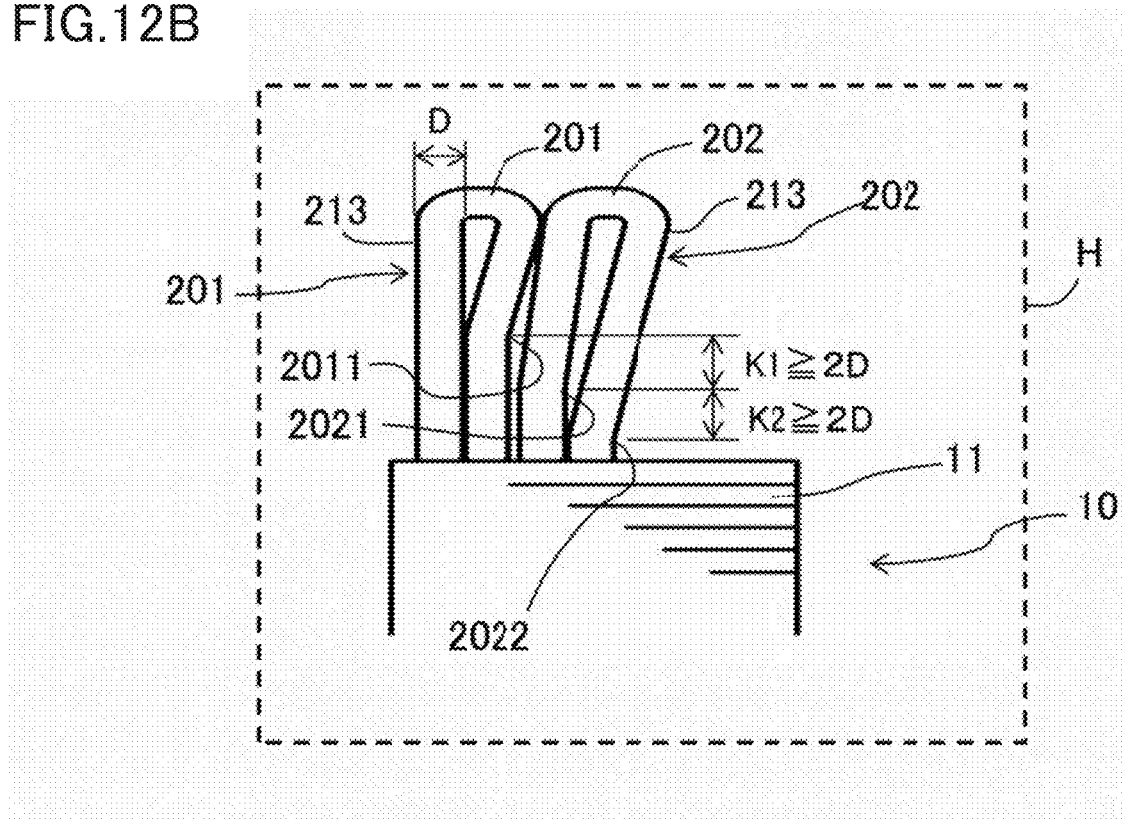
FIG. 12B is an explanatory view for explaining the coil end portion of the armature coil of the electric rotating machine according to Embodiment 1.

FIG. 12A is a schematic view illustrating the coil end portion of the armature coil of the electric rotating machine according to Embodiment 1. FIG. 12B is an explanatory view for explaining the coil end portion of the armature coil of the electric rotating machine according to Embodiment 1; FIG. 12B illustrates part of the armature 10, surrounded by a frame H indicated by the broken line in FIG. 12A. In FIGS. 12A and 12B, when the reference numeral 201 designates an armature coil at the inner diameter side of the armature 10 and the reference numeral 202 designates an armature coil at the outer diameter side thereof, the armature-coil element 201 at the inner diameter side has an inflection point 2011 and the armature-coil element 202 at the outer diameter side has inflection points 2021 and 2022.

The inflection points 2011, 2021, and 2022 are arranged in such a way that as being situated more toward the radially outside of the armature iron core 11, the inflection point more approaches the axis-direction endface of the armature iron core 11. Such a configuration makes it possible to prevent the inflection points from interfere with one another; thus, a further-downsized electric rotating machine can be obtained.

In addition, it is desirable that when K1 denotes the axial-direction distance between the inflection point 2011 of the inner-diameter-side armature coil element 201 and the inflection point 2021 of the outer-diameter-side armature coil element 202 and D denotes the radial-direction width of the coil conductor of each of the armature coil elements 201 and 202, the equation [K1≥2D] is established. Moreover, it is desirable that when K2 denotes the axial-direction distance between the inflection point 2011 of the inner-diameter-side armature coil element 201 and the inflection point 2022 of the outer-diameter-side armature coil element 202, the equation [K2≥2D] is established.

Embodiment 2

Figure 13:
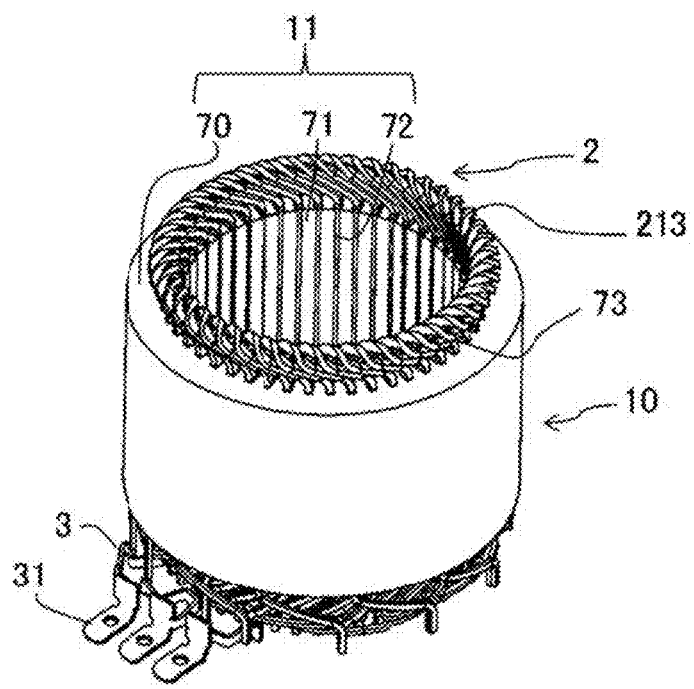
FIG. 13 is a perspective view of an armature in an electric rotating machine according to Embodiment 2.
Figure 14:
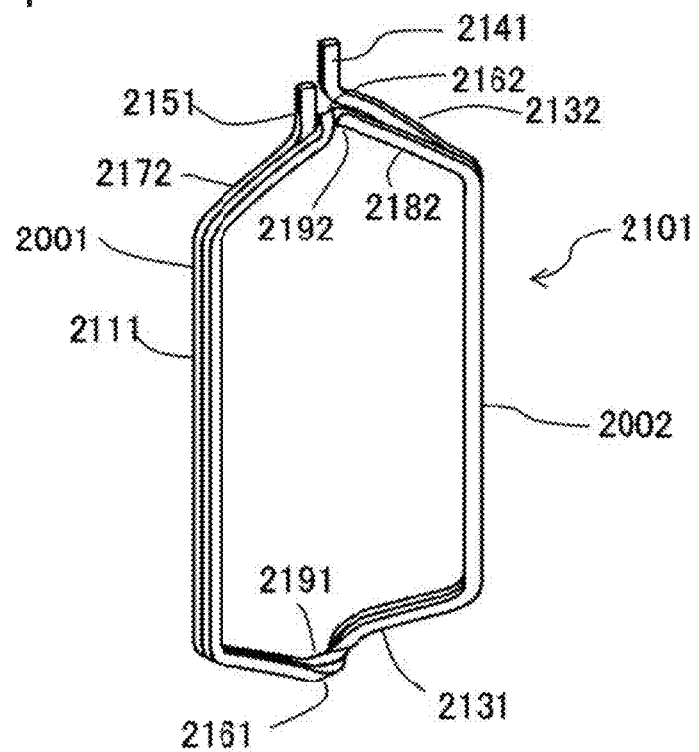
FIG. 14 is a perspective view of an armature coil of the electric rotating machine according to Embodiment 2.
Figure 15:
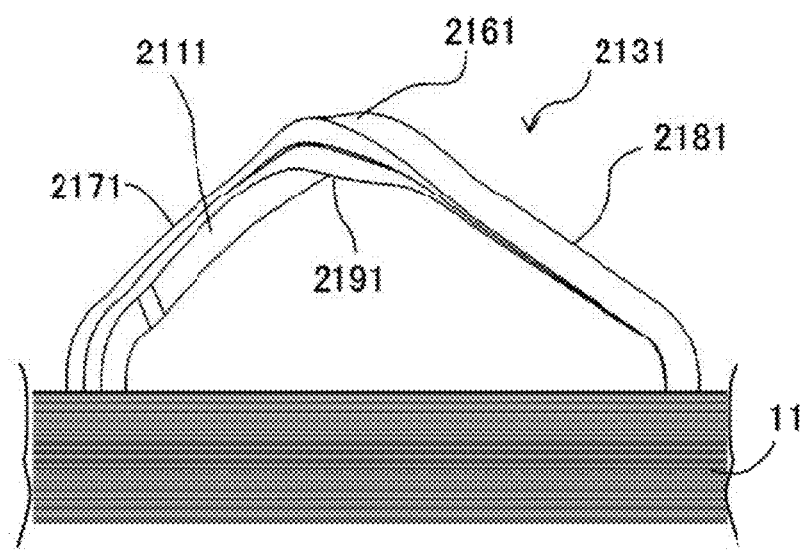
FIG. 15 is a schematic view of the coil end portion of an armature-coil element in the electric rotating machine according to Embodiment 2, when viewed from a direction perpendicular to the axial direction of the electric rotating machine.
Figure 16:
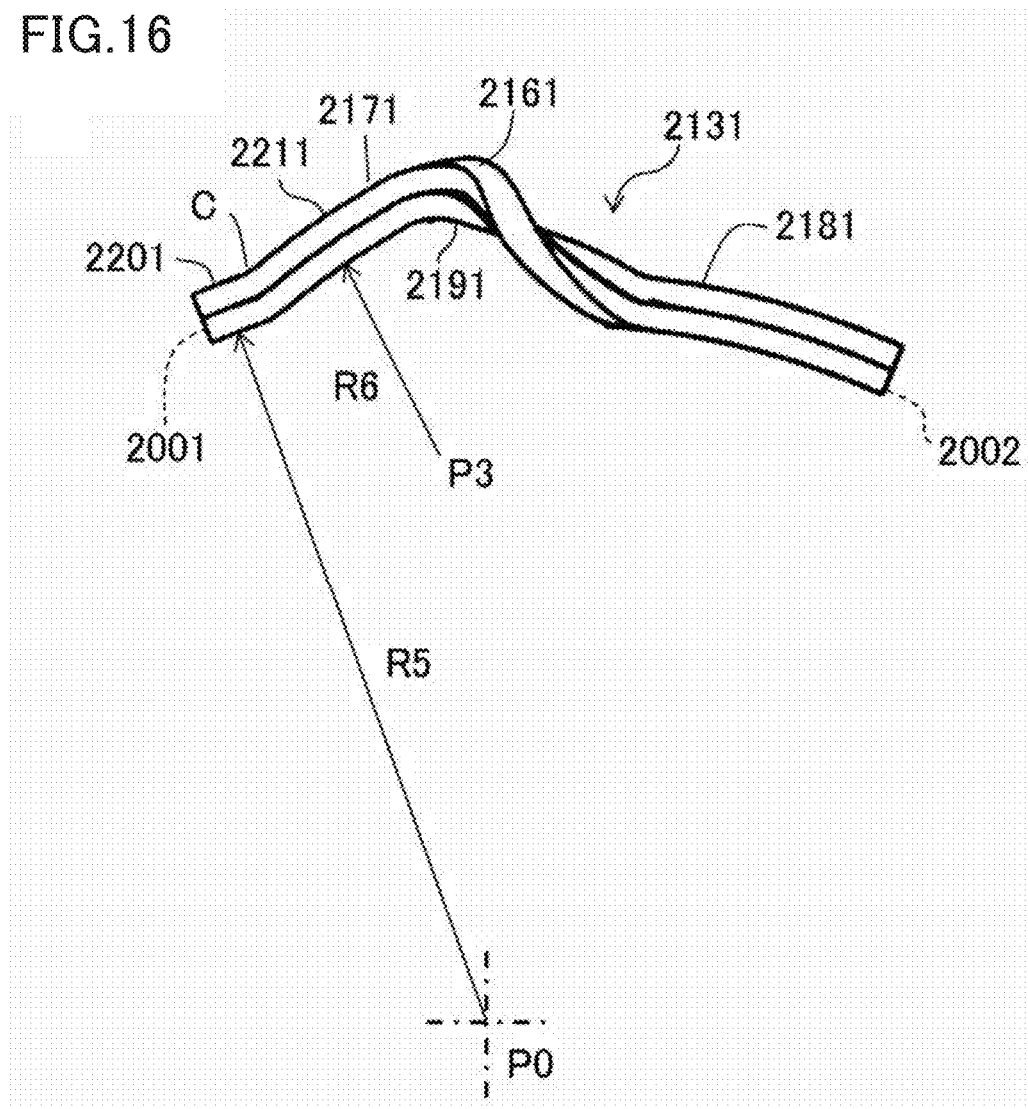
FIG. 16 is an explanatory view of the coil end portion of an armature-coil element in the electric rotating machine according to Embodiment 2, when viewed from the axial direction of the electric rotating machine.

Next, an electric rotating machine according to Embodiment 2 will be explained. FIG. 13 is a perspective view of an armature in an electric rotating machine according to Embodiment 2; FIG. 14 is a perspective view of an armature coil in the electric rotating machine according to Embodiment 2; FIG. 15 is a schematic view of the coil end portion of an armature-coil element in the electric rotating machine according to Embodiment 2, when viewed from a direction perpendicular to the axial direction of the electric rotating machine; FIG. 16 is an explanatory view of the coil end portion of an armature-coil element in the electric rotating machine according to Embodiment 2, when viewed from the axial direction of the electric rotating machine. As illustrated in each of FIGS. 13 through 16, the armature 10 of the electric rotating machine has an armature-coil element 2101 formed by winding rectangular-cross-section coil conductors 2111 twice or more times.

As illustrated in FIGS. 13 through 16, the armature-coil element 2101 has a first coil conductor portion 2001 and a second coil conductor portion 2002 to be inserted into the respective slots 72 that are each formed between the adjacent teeth 71 of the armature iron core 11, a first coil end portion 2131, a second coil end portion 2132, a first coil terminal 2141, and a second coil terminal 2151. The armature-coil element 2101 is formed by doubly winding the coil conductor 2111 having a length substantially twice as long as the length of the armature-coil element 21 according to foregoing Embodiment 1.

The first coil end portion 2131 of the armature-coil element 2101 is formed in the shape of a mountain in which the coil conductor 2111 itself is doubly superimposed, and has a first oblique side 2171, a second oblique side 2181, and a first apex portion 2161 situated between the first oblique side 2171 and the second oblique side 2181. Although the second coil end portion 2132 is formed in the shape of a mountain, a second apex portion 2162 is configured with a single coil conductor 2111. Each of a first oblique side 2172 and a second oblique side 2182 in the second coil end portion 2132 is formed of a double coil conductor 2111; a first coil terminal 2141 and a second coil terminal 2151 are arranged in correspondence to the position of the second apex portion 2162.

Moreover, a first crank portion 2191, formed in the same manner as the crank portion 219 in the armature coil of the electric rotating machine according to Embodiment 1, is provided close to the first apex portion 2161; a second crank portion 2192, formed in the same manner as the crank portion 219 in the armature coil of the electric rotating machine according to Embodiment 2, is provided close to the second apex portion 2162.

Furthermore, the first oblique side 2171 in the first coil end portion 2131 has an inflection point C. The base point P0 of a curvature radius R5 of the first bending portion 2201 ranging from the first coil conductor portion 2001 to the inflection point C is located on the center axis of the electric rotating machine; the base point P3 of a curvature radius R6 of the second bending portion 2211 ranging from the inflection point C to the first crank portion 2191 is located at a position displaced toward the radially outside from the center axis of the electric rotating machine. In this situation, R5 is larger than R6, i.e., the curvature of the second bending portion 2211 is set to be larger than that of the first bending portion 2201.

As far as the manufacturing method for the armature coil in the electric rotating machine according to Embodiment 2 is concerned, at first, the coil conductor 2111 having a length substantially twice as long as that of Embodiment 1 is linearly cut out; next, crank portions are formed at the longitudinal-direction central portion of the coil conductor 2111 and at the respective positions, at the both sides of the central portion, that each are apart from the central portion by the half-circumference length of the armature-coil element 2101. Accordingly, the crank portions are formed at the three positions.

Next, after the linear coil conductor 2111 is doubly wound, the mountain-shaped first coil end portion 2131 and second coil end portion 2132 are formed. In this situation, the foregoing crank portion formed in the central portion becomes the second crank portion 2192 illustrated in FIG. 14; the foregoing two crank portions formed at the both sides of the central portion are superimposed on each other so as to become the first crank portion 2191 illustrated in FIG. 14.

After that, by use of dies the same as the first die 41 and the second die 42 illustrated in FIGS. 9 and 10, the first bending portion 2201 and the second bending portion 2211 are formed in the first coil end portion 2131. The other configurations are the same as those in the manufacturing method for the armature coil according to foregoing Embodiment 1.

In addition, in FIG. 16, the second bending portion 2211 is provided in the first oblique side 2171; however, it may be allowed that the portion from the inflection point C to the first crank portion 2191 is formed in the shape of a straight line.

Because as described above, a bending portion is formed in the first oblique side 2171 of the coil end portion 2131, the position of the first crank portion 2191 can be displaced toward the outer-diameter side; thus, the armature coil 2 can be configured while avoiding interference between adjacent armature-coil elements. Moreover, because provision of the inflection point C can displace the first oblique side 2171 toward the outer-diameter side, it is made possible that interference, at the crank portion, with the coil end portion of the adjacent armature-coil element is suppressed and hence the coil end portion can be downsized. Furthermore, because when viewed from the axial direction, the coil end portion is formed in a two-dimensional shape without any twisting and any bending, manufacturing of the armature-coil element and control of the product shape are facilitated; thus, because there is obtained a simple structure in which a complex structure such as a crank portion is not provided, damage to the film of the coil conductor is reduced.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present application. For example, there are included the case where at least one constituent element is modified, added, or omitted and the case where at least one constituent element is extracted and then combined with constituent elements of other embodiments.

What is claimed is:

1. An electric rotating machine comprising:
   an armature iron core provided with two or more teeth arranged in a ring-shaped manner and with a ring-shaped yoke for connecting the two or more teeth;
   an armature coil mounted on the armature iron core; and
   a rotor that has a magnetic-field pole and whose outer circumferential portion faces an inner circumference portion of the armature iron core through an air gap,
   wherein the armature coil includes two or more armature-coil elements whose cross sections are each formed in a rectangular shape,
   wherein the armature-coil element has
      a first coil conductor portion and a second coil conductor portion that are contained, at a predetermined pitch, in respective slots formed between the teeth that are adjacent to each other, and
      a coil end portion that connects the first coil conductor portion with the second coil conductor portion and that is disposed at an axis-direction end portion of the armature iron core,
   wherein the coil end portion has
      a crank portion that is provided in an apex portion of the coil end portion and is displaced in a radial direction of the armature iron core,
      a first oblique side that connects the first coil conductor portion with the crank portion and slants with respect to an axis-direction endface of the armature iron core, and
      a second oblique side that connects the second coil conductor portion with the crank portion and slants with respect to the axis-direction endface of the armature iron core, and
   wherein at least one of the first oblique side and the second oblique side has an inflection point, before being connected with the crank portion, that functions as a base point of a bending portion that is bent toward a radially outside of the armature iron core,
   wherein the bending portion includes
      a bending portion ranging from the first coil conductor portion or the second coil conductor portion to the inflection point, and
      a bending portion ranging from the inflection point to the crank portion, and
   wherein a curvature of the bending portion ranging from the first coil conductor portion or the second coil conductor portion to the inflection point and a curvature of the bending portion ranging from the inflection point to the crank portion are formed to be different from each other.

2. The electric rotating machine according to claim 1, wherein the curvature of the bending portion ranging from the inflection point to the crank portion is formed to be larger than the curvature of the bending portion ranging from the first coil conductor portion or the second coil conductor portion to the inflection point.

3. The electric rotating machine according to claim 1, wherein the inflection point is disposed in such a way as to approach the axis-direction endface of the armature iron core, as a position thereof is situated more toward the radially outside of the armature iron core.

4. The electric rotating machine according to claim 2, wherein the inflection point is disposed in such a way as to approach the axis-direction endface of the armature iron core, as a position thereof is situated more toward the radially outside of the armature iron core.

\* \* \* \* \*